United States Patent Office 3,340,004
Patented Sept. 5, 1967

3,340,004
PROCESS FOR FORMING ACTIVE CUPROUS HALIDE SORBENTS
Edward Allen Hunter, Lake Jackson, Tex., and Warren Alfred Knarr, Ponca City, Okla., assignors to Esso Research and Engineering Company, a corporation of Delaware
No Drawing. Continuation of application Ser. No. 418,902, Dec. 16, 1964. This application Sept. 21, 1966, Ser. No. 581,115
7 Claims. (Cl. 23—97)

This application is a continuation application of U.S. application Ser. No. 418,902, filed Dec. 16, 1964, now abandoned.

This invention is directed to an improved process for preparaing cuprous halide solutions, and the use of such solutions in forming active cuprous halide sorbents capable of selectively sorbing and thereby recovering olefins from hydrocarbon streams containing them even in very dilute amounts.

More specifically, the present invention is directed to an improved process for preparing ambient temperature stable cuprous halide solutions containing from about 8 to about 15 wt. percent cuprous halide by dissolving a cuprous halide salt in a $C_5$ to $C_{10}$ normal mono alpha-olefin solvent, or solvent mixture containing chiefly $C_5$ to $C_{10}$ normal mono alpha-olefins, at temperatures of about −40 to about 55° F.; complexing said cuprous halide solutions at essentially ambient temperatures (viz., temperatures higher than those employed to initially dissolve the cuprous salt, e.g. temperatures ranging from about 60 to about 85° F.) with a suitable complexing agent, e.g. butadiene; and then activating the cuprous halide sorbent by heating said complex at temperatures of about 140 to about 200° F. to decomplex it by thermal removal of the complexing moiety, e.g. butadiene, therefrom. The thus activated cuprous halide sorbent can then be used directly as a selective sorbent for olefins by contact with olefin-containing hydrocarbon streams. The thus sorbed olefin can be recovered readily by heating the sorbent to desorb the olefin therefrom, and the reactivated sorbent can then be reused for additional olefin sorption-desorption cycles.

It is known to prepare cuprous halide sorbents of good quality by dissolving cuprous chloride in isobutylene or less frequently butene-1, adding a suitable complexing agent, e.g. butadiene, to precipitate out the cuprous chloride-butadiene complex, recovering the complex and decomposing it thermally to give the desired active cuprous chloride sorbent.

These prior art processes suffer from several disadvantages, e.g. considerable refrigeration is required to maintain the isobutylene or butene-1 solvent in the liquid state not only during the solution of the cuprous chloride therein but also during complexing of the dissolved cuprous chloride with the complexing agent.

Another and still greater disadvantage attendant to the use of these prior art procedures is that the solubility of cuprous chloride in isobutylene shows a pronounced maximum at about −18° C. (0° F.) so that it is necessary to operate very closely to this temperature in order to obtain an acceptable yield of sorbent. If the temperature at any point gets more than a few degrees away from −18° C. (0° F.) not only is the yield of sorbent reduced sharply, but also cuprous chloride is precipitated out from the solution thereof plugging the lines, pumps, filters, etc., employed during the processing of the cuprous chloride solutions to the active cuprous chloride catalyst sorbent. Thus, the temperature must be controlled closely over a narrow range of subambient temperatures when using isobutylene as a solvent in preparing cuprous halide sorbents not only during the dissolving step but also when transporting the cuprous halide solution from the dissolving tank to the complexing tank and during the dissolving step. This is not only costly due to refrigeration costs involved, but also detracts from process flexibility. A still further disadvantage is than when butadiene is added at these low temperatures, difficulty is frequently experienced with the butadiene condensing which results in at least a portion of the butadiene being added as a liquid. This is known to result in the formation of the product sorbent complex in a very finely divided and very friable form (which is undesirable for use in an olefin separation process, esp., one in which unsupported active sorbent particles are employed, e.g. olefin recovery streams using fluidized sorbent beds).

It would be indeed desirable if these difficulties could be eliminated by the use of a cuprous halide solvent which is a liquid at atmospheric pressure and ambient temperatures. Unfortunately, no significant progress was made in this field until the development of the present invention due to the fact that the $C_5$ or higher olefins have a very limited solvent action on cuprous chloride at normal ambient temperatures, viz., 60 to 85° F. Attempts to use these temperatures employing the higher olefins to dissolve cuprous chloride result in a cuprous halide solubility of only about 3% by weight or less which is insufficient to give an attractive yield of sorbent.

According to the present invention, however, there is provided a method which permits the obtaining of active cuprous halide sorbents having very good quality, sorbtive capacity and particle size in good yields from a solution of cuprous halide in higher olefins, which solution can be complexed using essentially ambient temperatures, and therefore offers a more economical and flexible process since it does not require the mandatory refrigeration and close temperature control which is associated with the conventional prior art process using isobutylene as solvent.

The present invention is based on the discovery that although cuprous halide salts are not generally very soluble in olefins at ambient temperatures, a solution of about 8 to about 15 wt. percent cuprous halide salt in olefin can be prepared by dissolving the selected cuprous halide salt, e.g. cuprous chloride, at temperatures of −40 to 55° F. when a $C_5$ to $C_{10}$ mono alpha-olefin or mixture thereof is used as solvent. Quite surprisingly, this solution may then be warmed to temperatures approaching ambient room temperatures without the cuprous halide salt precipitating out for an extended period of time. Moreover, the complexing can be conducted at ambient temperatures without any detrimental effect on sorbent quality.

The complexing agent, e.g., butadiene or other suitable complexing agent, can then be added to precipitate out the insoluble cuprous halide complex. This complex can then be activated by heating at temperatures of 150 to 200° F. to thermally remove the complexing moiety.

The terms "sorbent," "sorbing," "sorb," and similar terms as used herein are employed to include both absorption and adsorption as it is believed that both types of phenomena are involved in selective recovery of olefins. The term "ligand" as employed herein with respect to the complexing agent used is intended to denote the presence of a complexing agent containing a functional group capable of forming stable copper complexes having a mole ratio of copper to complexing moiety greater than 1:1. Preferably a complexing agent is employed which forms a stable complex having a mole ratio of copper to complexing moiety of 2:1 and higher.

Such compounds include both materials which form only complexes having said ratios of copper to complexing compound greater than 1:1 and compounds which form complexes having a ratio of 1:1 or less which upon decomplexing pass through a stable complex having a ratio of copper to complexing compound greater than 1:1. Thus, certain materials, e.g., nitriles, diolefins, acetylenes, carbon monoxide under ordinary conditions forming a 2:1 complex can be made to complex in ratios of copper to complexing compound of 1:1 or less. However, upon dissociation, complexing material is released selectively from the bed of cuprous halide until the stable complex, viz. the complex having a copper to complexing moiety ratio above 1:1, e.g. 2:1 stoichiometric complex, is completely formed before further decomplexing to the uncomplexed cuprous halide occurs. In this specification by "stable complex" is meant a stoichiometric complex stable upon dissociation as described in the preceding sentence. Such complexing agents (ligands) as contemplated herein are carbon monoxide, organic nitriles and HCN, organic compounds having an acetylenic group, i.e. as present in acetylene, and polyolefins, i.e., especially diolefins, e.g., butadiene, isoprene, etc. More than one of these functional groups can be present in a single molecule of the complexing compound. In addition, the complexing compound can contain other functional groups so long as they do not interfere with complex formation.

Suitable cuprous halide salts for use in accordance with this invention include cuprous chloride, cuprous bromide, and cuprous iodide with the preferred cuprous halide salt being cuprous chloride. Hence the cuprous halide is selected from the group consisting of cuprous chloride, cuprous bromide and cuprous iodide. The purity of the cuprous halide salt should be at least 90%. Usually the purity of the cuprous halide salt ranges from 90 to 100%, and preferably from 99.0 to 100%. The cuprous halide salt should be substantially moisture-free. The moisture content of the cuprous halide salt at the time it is added to the $C_5$ to $C_{10}$ mono alpha olefin solvent(s) should usually not exceed 1.0 wt. percent and preferably should not exceed about 0.5% (based on dried cuprous halide salt).

The $C_5$ to $C_{10}$ mono alpha olefins whose use is contemplated in accordance with this invention as solvents to dissolve the cuprous halide salt are: pentene-1, hexene-1, heptene-1, octene-1, nonene-1, decene-1, and mixtures of any two or more of the above mentioned $C_5$ to $C_{10}$ mono alpha-olefins. The solvent, when a mixture of $C_5$ to $C_{10}$ mono alpha-olefins is employed, can contain a small amount of other hydrocarbon materials with the proviso being that the solvent mixture should be comprised chiefly of $C_5$ to $C_{10}$ mono alpha-olefins, viz., at least about 60 wt. percent and preferably from 70–100 wt. percent of said $C_5$ to $C_{10}$ mono alpha-olefins based on total solvent. Such optional hydrocarbon diluents as paraffins, cycloparaffins, cycloolefins, conjugated and nonconjugated diolefins, and aromatics can be tolerated in small amounts. When conjugated diolefins are present, the concentration thereof should be $<1.0$ wt. percent, and preferably $<$ about 0.5 wt. percent.

Before the cuprous halide salt is added to the $C_5$ to $C_{10}$ mono alpha-olefin solvent, the solvent is cooled to a temperature ranging from about −40 to about 55° F. and preferably −30 to 10° F. The cuprous halide salt is then added gradually to the solvent with agitation until the solution contains from about 8 to 15% by weight cuprous chloride dissolved therein. Throughout this time, the temperature of the solvent is maintained at from −40 to 55° F. and preferably from about −30 to 10° F. Of course the contact of said cuprous halide with the solvent at the prescribed temperatures is maintained for a sufficient time to enable dissolving of the target concentration (8 to 15 wt. percent) of said cuprous halide salt therein. Then, the temperature of the solvent can be allowed to rise to approximately ambient room temperatures, e.g., 60 to 85° F., or it can even be heated to warm it to these temperatures prior to conducting the complexing of these cuprous halide solutions with the desired complexing agent. It should be understood, however, that it is not necessary to heat the cuprous halide solution as complexing can be accomplished very satisfactorily at below ambient temperatures, e.g. $>55$ to $<60°$ F. or even below. To avoid increased refrigeration costs the dissolved cuprous halide can be pumped from the cooled dissolving tank using nonrefrigerated transfer lines and stored in a nonrefrigerated storage device prior to use in any given sorbent production campaign. If a continuous cuprous halide sorbent production is contemplated, the cuprous halide solution can be pumped directly from the cooled dissolving tank to the nonrefrigerated complexing tank. Hence this invention enables savings in refrigeration costs normally encountered in transfer, storage and complexing and at the same time substantially avoids the aforementioned problems encountered in the low temperature dissolving and complexing procedures.

As mentioned herein above, it is preferable to employ a complexing compound which forms an insoluble complex in the solvent mixture employed to dissolve the cuprous halide salt. Suitable complexing compounds which can be listed as exemplary of those suitable for use in the present invention include, but are not limited to, the following: $C_3$–$C_{10}$ conjugated or nonconjugated aliphatic cyclic or acyclic polyolefins, e.g., butadiene-1,3, isoprene, piperylene, allene, isoprene, octadienes, cyclohexadienes, cyclooctadienes, divinylbenzene, cyclododecatriene, cyclooctatetraene; $C_2$–$C_{10}$ aliphatic or alicyclic acetylenes or acetylenes containing additional unsaturation, e.g., acetylene, methylacetylene, propylacetylenes, phenylacetylene, vinylacetylene, etc.; $C_2$–$C_{10}$ or higher unsaturation or saturated aliphatic or alicyclic nitriles, e.g., acetonitrile, acrylonitrile, propionitrile, phenylnitrile, methacrylonitrile, ethacrylonitrile, etc., can likewise be used. The preferred complexing agent is butadiene.

The cuprous halide solution is contacted with the suitable complexing agent preferably by passing the complexing agent into the cuprous halide-solvent solution at temperatures ranging from about 60 to +85° F. using pressures ranging from about 0 to 50 p.s.i.g. for reaction periods ranging from about 30 to 240 minutes. It has been found helpful to control the rate of the addition of the complexing compound to a rate ranging from about 0.05 to 0.6 mole of complexing compound per hour per mole of copper halide salt dissolved in the $C_5$ to $C_{10}$ mono alpha-olefin solvent.

When the complexing agent is butadiene, the butadiene can be used in concentrated or dilute form, e.g., diluted with either an inert gas, such as nitrogen, methane, ethane, etc.; or naturally diluted butadiene as present in butadiene containing $C_4$ petroleum streams, e.g., butadiene diluted with butane and butenes, can be employed so long as the diluent do not interfere with the precipitation of the desired solid cuprous halide-butadiene complex. When using butadiene as the complexing agent, the temperatures at which the butadiene is contacted with the cuprous halide solution usually range from about 60 to +85° F. In such cases, the butadiene is usually passed in gaseous form (diluted or undiluted with an inert gas) into the cuprous halide solution at a butadiene addition rate ranging from 0.05 to 0.5 mole per hour per mole of dissolved cuprous halide salt.

After complete precipitation of the cuprous halide-butadiene complex has taken place, the precipitated complex is passed in the form of a slurry to a suitable deliquefying device, such as a centrifuge, hydrocyclone, or other equivalent deliquefying apparatus. The partially deliquefied cuprous halide-butadiene complex is then collected, usually in the form of a wet cake, and then dried and actuated.

The newly formed complex is heated at temperatures ranging from 140 to 200° F., usually from 160 to 190° F., and preferably from 170 to 180° F., to thermally drive off the butadiene (or other complexing moiety) leaving the cuprous halide sorbent particles in an activated condition suitable for direct use in selectively sorbing olefins from hydrocarbon streams containing them. At the conclusion of the activation procedure, the cuprous halide sorbent particles are observed to have the following physical typical properties:

Physical Properties:

| | Values |
|---|---|
| Surface Area M²/gram | 5 to 7 |

Approximate Particles Size Distribution—

| Microns: | Weight percent |
|---|---|
| 0–10 | 0–0.5 |
| 10–20 | 0–0.8 |
| 20–50 | 4–8.0 |
| 50–80 | 10–25.0 |
| 80–110 | 4–25.0 |
| 110+ | 50–85.0 |

In accordance with this invention, it has been observed that the cuprous halide sorbent particles prepared as indicated above can remove selectively essentialy all (e.g., 95% and more) of the olefin present in and sought to be selectively removed from hydrocarbon streams containing such olefin(s). This is true even when the olefin is present in said hydrocarbon streams in concentrations as low as about 10 to 30% (based on total hydrocarbons). Moreover, the cuprous halide sorbents prepared in accordance with this invention can be used to selectively remove other preferential complex forming compounds from streams containing them, e.g. to remove ethylene, ammonia, etc., from streams containing them.

The recovery procedure, whereby the selectively sorbed olefin is removed from the hydrocarbon mixture containing it, can be conducted conveniently in accordance with conventional procedures, e.g., as follows:

The mixed gas stream containing the olefin to be recovered is contacted with the active sorbent at conditions such that the partial pressure of the olefin to be recovered is greater than the dissociation pressure of the complex of that olefin with the sorbent. In practice this usually means a temperature of about 50° F. or lower and a partial pressure of the desired olefin of about 3 p.s.i.a. or greater.

This contacting period is continued until the capacity of the sorbent is substantially occupied by olefin. The loaded sorbent is then stripped free of enclosed gases, preferably employing a portion of the olefin being recovered as a stripping gas. The loaded and stripped sorbent is then subjected to conditions of temperature and pressure such that the dissociation pressure of the complex exceeds the partial pressure of the sorbed olefin. Consequently, the complex decomposes with release of the sorbed olefin which is then recovered by conventional means. The loaded sorbent is usually desorbed at temperature ranging from about 150 to about 200° F. although lower or higher temperatures can be used.

This invention will be illustrated in greater detail by the following examples.

EXAMPLE 1

908 grams of pentene-1 (Phillips 99+%) and 90 grams of powdered cuprous chloride (Bowers powder, 99+%) having a moisture content of <0.5 wt. percent were mixed at a temperature of 50° F. and stirred for one hour while the temperature of the solvent was maintained at approximately −26° F. At the conclusion of the one-hour stirring, the solution of the cuprous chloride was apparently complete. The mixture was then allowed to stand at ambient room temperature. When the temperature had reached 63° F., an aliquot sample was taken and this sample contained 9.5 wt. percent cuprous chloride showing that the solution was still essentially complete.

When the solution temperature reached 66° F., gaseous butadiene was bubbled into the system with stirring. The butadiene was added at an average addition rate of about 0.4 mole of butadiene per hour per mole of cuprous chloride salt dissolved (100% excess butadiene). The butadiene addition was continued for a period of approximately 2.5 hours with the temperature rising to and holding at approximately 23° C. (74° F.). By this time a heavy yellow precipitate of the cuprous chloride-butadiene complex appeared. The precipitate was recovered, blown dry at 70 to 80° F. with gaseous butadiene, and then activated (decomplexed) at 170 to 180° F. prior to testing as a sorbent for butadiene recovery from a refinery hydrocarbon stream containing butadiene in approximately 33 wt. percent concentration. This refinery stream had the following components.

| Components: | Concentration (wt. percent) |
|---|---|
| $C_3H_6$ | 2.08 |
| $C_3H_8$ | 0.46 |
| Butadiene | 33.15 |
| $C_4H_8$, total | 62.16 |
| Iso-$C_4H_{10}$ | 0.45 |
| n-$C_4H_{10}$ | 1.14 |
| $C_5H_8$ | 0.02 |
| $C_5H_{10}$ | 0.15 |
| Iso-$C_5H_{12}$ | 0.12 |

The active cuprous chloride sorbent thus prepared was tested over three cycles of complexing and decomplexing. The thus prepared olefin sorbent showed good activity and about 75% of the theoretical sorptive capacity for butadiene. This is a value which compares quite favorably with cuprous chloride sorbent preparations employing the more expensive prior art procedures.

The cuprous chloride sorbent particles prepared above possessed the following particle size distribution.

| Microns: | Weight percent |
|---|---|
| 0–10 | 0.0 |
| 10–20 | 0.4 |
| 20–50 | 5.0 |
| 58–80 | 11.8 |
| 80–110 | 4.6 |
| 110+ | 78.0 |

EXAMPLE 2

719 grams of hexene-1 (Phillips 99+%) and 80 grams of powdered cuprous chloride (Bowers powder, 99+%) having a moisture content of less than 0.5% were mixed at a temperature of −10° C. (14° F.) and stirred for two hours with the temperature maintained at approximately −10° C. (14° F.). The solution was then allowed to stand at ambient conditions for 1½ hours after which time the temperature had risen to 18° C. (64° F.). Butadiene was then bubbled into the system with stirring. The butadiene was added at an average addition rate of about 0.45 mole of butadiene per mole of cuprous chloride per hour (approximately 110% excess butadiene). The butadiene addition was over a period of about 2.5 hours using a butadiene addition rate of 0.45 mole/hr./mole of dissolved cuprous chloride with the temperature rising gradually to about 24° C. (75° F.). The resulting heavy yellow precipitate was filtered off, blown dry at 70–80° F. with gaseous butadiene and then activated by heating at 170–180° F.

Roller analysis on the dried precipitate showed the following particle size distribution.

| Size, μ | Weight percent |
|---|---|
| 0–10 | 0.2 |
| 10–20 | 1.5 |
| 20–50 | 9.8 |
| 50–80 | 26.9 |
| 80–110 | 50.1 |
| >110 | 11.5 |

This activated sorbent was subjected to testing as described in Example 1. This olefin sorbent showed good activity and about 70% of the theoretical capacity for butadiene.

EXAMPLE 3

Using a method already taught in the art, 2500 gallons of isobutylene was cooled to −18° C. and to this was added 150 lb. of CuCl powder (99.9%). Agitation was carried out for 1 hour to accomplish solution. The resulting solution was filtered and then over a 75-minute period butadiene was added using a 10% excess. The resulting precipitated complex was removed from the liquid by use of a centrifuge followed by drying in a fluid drier for 2 hours at 76° C. The sorbent prepared had the following particle size.

| Range, $\mu$ | Weight percent |
|---|---|
| 0–10 | 9.93 |
| 6–20 | 3.71 |
| 20–50 | 1.81 |
| 50–75 | 56.31 |
| 75–120 | 20.19 |
| >110 | 8.14 |

EXAMPLE 4

1000 cc. of a $C_7$ to $C_{10}$ cut containing primarily $C_7$ to $C_{10}$ alpha monoolefins was chilled to −18° C. and to this was added 80 g. of powdered cuprous chloride (Bower, 99+%). Solution was accomplished by stirring for 2 hours. The resulting solution was warmed to ambient temperatures and allowed to stand at ambient conditions for 1½ hours after which time the temperature had risen to 20° C. Butadiene was then bubbled into the system with stirring. The butadiene was added at an average addition rate of about 0.45 mole of butadiene per hour per mole of cuprous chloride (approximately 110% excess butadiene). The butadiene addition was over a period of about 2.5 hours with the temperature rising gradually to about 24° C. (75° F.). The resulting complex which precipitated was filtered and blown dry with gaseous butadiene at 70–80° F. The dried complex was then activated by heating at 170–180° F. A test of the particles prepared showed them to have a sorptive capacity of 72% of theoretical. The particles had the following size distribution.

| Size, $\mu$ | Weight percent |
|---|---|
| 0–10 | 0.2 |
| 10–20 | 0.6 |
| 20–50 | 7.3 |
| 50–80 | 23.4 |
| 80–110 | 22.4 |
| >110 | 53.9 |

The olefins used were characterized by the following analysis.

| Component: | Weight percent |
|---|---|
| Saturates | 0.3 |
| Olefins— | |
| Linear | 74.5 |
| Cyclic | 9.3 |
| Diolefins— | |
| Conjugated | 0.3 |
| Nonconjugated | 12.4 |
| Aromatics | 3.2 |
| | 100.0 |

*Distribution by number of carbon atoms*

| Compounds: | Weight percent |
|---|---|
| $C_7$ | 44.7 |
| $C_8$ | 30.4 |
| $C_9$ | 24.2 |
| $C_{10}$ | 0.7 |

*Olefin types*

| Olefins | Weight percent |
|---|---|
| Type I | 87.9 |
| Type II trans | 3.9 |
| Type II cis | 1.7 |
| Type III | 4.6 |
| Type IV | 3.0 |

What is claimed is:

1. In a process for preparing cuprous halide sorbents from the corresponding cuprous halide salts wherein the cuprous halide salt is first dissolved in an olefinic solvent and then complexed with a complexing agent resulting in an insoluble complex which is then decomplexed to provide the active sorbent, the improvement which comprises contacting a substantially moisture-free cuprous halide salt selected from the group consisting of cuprous chloride, cuprous bromide and cuprous iodide with a $C_5$ to $C_{10}$ mono alpha-olefin at temperatures ranging from −30° F. to 10° F. and maintaining said contact at said temperatures for a sufficient time to dissolve 8 to 15 wt. percent of said cuprous halide therein to form an ambient temperature stable cuprous halide solution containing from 8 to 15 wt. percent cuprous halide salt dissolved therein and stable at temperatures of 60° F. to 85° F., contacting said solution with a gaseous complexing agent capable of forming a stable, insoluble complex having a mole ratio of copper to complexing agent greater than 1:1 at temperatures of 60° F. to 85° F., isolating said insoluble complex and thermally decomplexing said complex at temperatures of from 140° F. to 200° F. to yield an activated cuprous halide sorbent of which >50 wt. percent has a particle size of >110$\mu$.

2. A process as in claim 1 wherein said cuprous halide is cuprous chloride.

3. A process as in claim 1 wherein said gaseous complexing agent is butadiene.

4. A process as in claim 3 wherein said sorbent is activated by heating said complex at temperatures ranging from 160° F. to 190° F.

5. A process as in claim 4 wherein said $C_5$ to $C_{10}$ mono alpha-olefin is pentene-1.

6. A process as in claim 4 wherein said $C_5$ to $C_{10}$ mono alpha-olefin is hexene-1.

7. A process as in claim 4 wherein said $C_5$ to $C_{10}$ mono alpha-olefin is comprised of a mixture of at least two $C_5$ to $C_{10}$ mono alpha-olefins.

References Cited

UNITED STATES PATENTS 2,336,643 12/1943 Schulze _____ 260—438.1 X
2,386,356 10/1945 Schulze et al. ____ 260—438.1 X OSCAR R. VERTIZ, *Primary Examiner.*

E. STERN, *Assistant Examiner.*